July 31, 1962  E. M. BLACKBURN  3,046,693
WIND OPERATED AMUSEMENT DEVICE
Filed Dec. 29, 1959
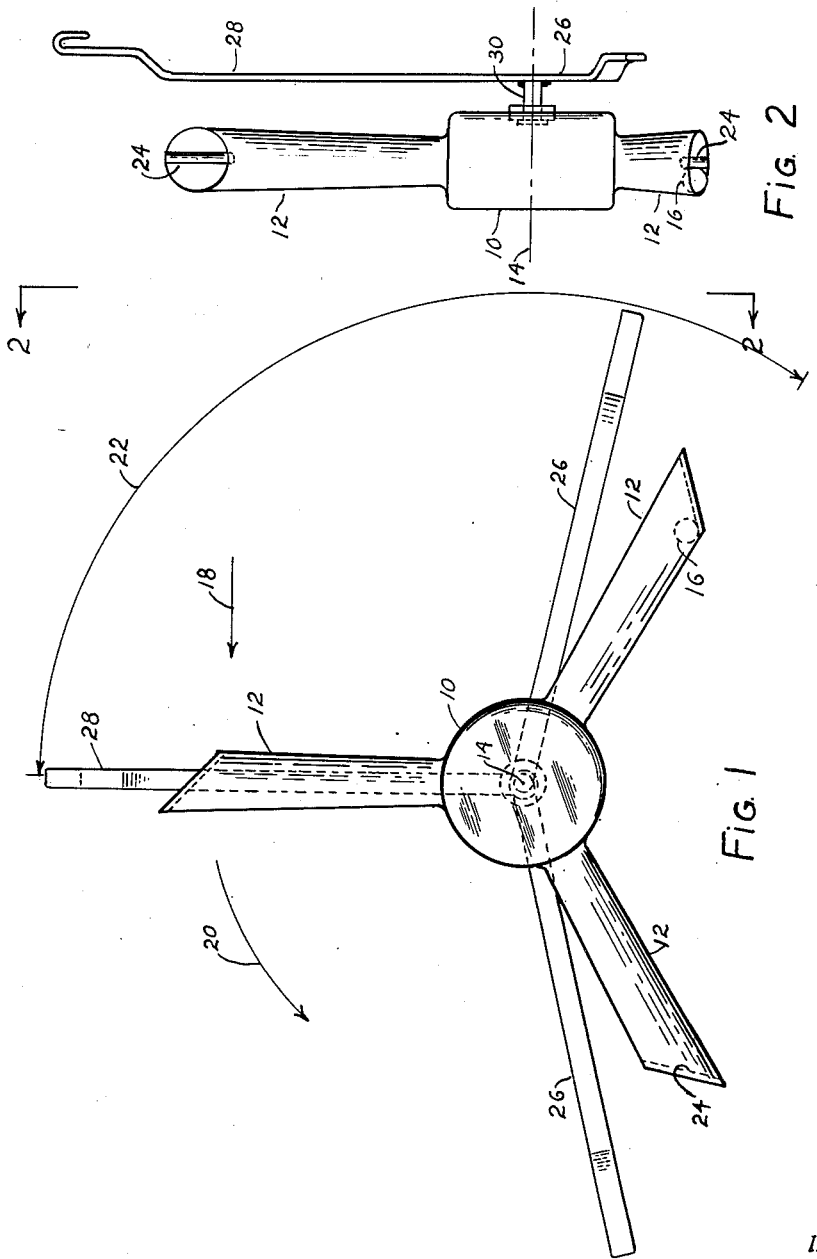
INVENTOR.
EDWARD M. BLACKBURN
BY
Eldon H. Luther
Attny.

3,046,693
WIND OPERATED AMUSEMENT DEVICE
Edward M. Blackburn, West Nyack, N.Y.
(521 5th Ave., New York 17, N.Y.)
Filed Dec. 29, 1959, Ser. No. 862,616
8 Claims. (Cl. 46—53)

The present invention relates generally to amusement devices for relatively young children and has particular relation to a wind-operated or wind-propelled device of this type.

The invention takes the form of a spoked device which rotates about its central axis when positioned in an air stream and which contains members that move from one spoke to another as the device rotates with this movement of these members being clearly visible.

The device is particularly well adapted for the amusement of small children during extended automobile trips in that it may be mounted on the outside of the side window of the automobile so that the air stream created by movement of the automobile will cause the device to rotate and accordingly amuse and hold the attention of children occupants.

In accordance with the invention the device comprises a central or body portion which is suitably supported for rotation about its axis. This body portion is hollow and preferably transparent and extending outwardly from the outer portion thereof and generally radial of this axis are a number of hollow arms which communicate with the interior of the body. These arms are transparent and are arranged in symmetrical fashion so that the device will be fairly well balanced for rotation about the axis of the body. Contained within the device is one or more relatively light, small members which may freely move throughout the length of the arms and may move from one arm through the body to another arm. The device is constructed so that when it is placed in an air stream which is traveling in a direction generally normal to the axis of the body portion it will rotate about this axis and the ends of each of the arms is open so that air may enter the upstream arm or arms and pass therethrough and through the body portion and out the downstream arm or arms as the device rotates. In this way the small member within the device is moved from one arm to another as the device rotates. While the outer ends of each of the arms is open it is necessary to insure that the movable member within the device cannot escape through the ends of the arms and accordingly these ends are provided with means to prevent such escape.

While the device of the invention may be used in any number of ways it is particularly well adapted for use in combination with an automobile and for this purpose a suitable mounting bracket is provided which enables the device to be easily and removably mounted on the exterior of the side window of an automobile with this bracket containing arms that engage the window with one arm having a portion that receives the upper end of the window and may be securely clamped in place by rolling the window to its uppermost position.

It is an object of this invention to provide a wind operated amusement device for young children.

A further object is the provision of such a device which is very simple in construction and economical to manufacture.

Still another object is the provision of such an amusement device which may be mounted on the exterior of the side window of an automobile so that it will be operated by the air stream passing the automobile.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIGURE 1 is a side elevational view of a preferred embodiment of the invention and discloses the wind operated amusement device mounted upon a support organization adapted to be removably attached to the window of an automobile; and, FIGURE 2 is a front elevational view taken generally from line 2—2 of FIGURE 1.

Referring now to the drawing, wherein like reference characters are used throughout to designate like elements, the illustrative and preferred embodiment of the organization depicted therein comprises a generally circular central housing or body portion 10 forming the hub of the device and from which extends the arms 12 with both the body portion and the arms being made of a generally transparent material with any known plastic which is relatively tough, resistant to fracture and sufficiently rigid to hold its shape being suitable. In the illustrative organization three arms 12 are employed although it will be understood that any number from two to the maximum number which it is feasible to extend from the housing 10 may be employed. These arms are generally radial of the central axis 14 of housing 10 and are symmetrical with relation to this axis so that the device is dynamically balanced for rotation about the axis.

As illustratively disclosed the arms 12 are disposed within a common plane normal to axis 14 with this being the preferred arrangement although it will be appreciated that the arms may, if desired, be angularly disposed with respect to such a plane, so long as they extend generally outward from the axis 14 and are disposed so as to provide a dynamic balance for rotation about this axis.

Positioned within the structure formed by the arms 12 and the housing 10 is one or more relatively small members or objects 16 with this member as disclosed being a ball and with the member being free to move throughout the length of the arms 12 and through the housing 10. Illustrative of the members 16 which may be employed are Ping-pong balls with these having been employed in one size of the invention. It is preferred that the member 16 be relatively light so that it may freely and easily be moved from one of the arms to another and it is also preferred that this member be colored so that its movement may be readily observed. It is also desirable that the arms 12 and the housing or body portion 10 be colored in order that a more attractive arrangement may be provided and in this regard it is an attractive arrangement to have each of the arms 12 a different color. As previously mentioned, the arms 12 and preferably also the hub or housing 10 are transparent or relatively transparent with this being necessary with respect to the arms and desirably with respect to the hub in order that the movement of the members 16 may be clearly seen.

The device is constructed so that it will be wind propelled for rotation about the axis 14 when it is disposed in a wind or air stream which is moving in a direction generally normal to the axis 14. As depicted in FIGURE 1, arrow 18 indicates the direction of the wind stream and arrow 20 indicates the direction of rotation of the device. This rotational movement is effected by chamfering the outer ends of each of the arms 12 as shown in FIGURE 1 with this chamfer preferably being in a plane generally parallel with axis 14. By means of this chamfer the wind resistance offered by the arms when in their upwardly extending position is substantially greater than that which they offer in their lower or downward extending position and accordingly rotation as indicated is effected.

In this connection it is noted that the outer end of each of the arms 12 is open so that air may enter and pass from the arms. Accordingly, during the movement of each of the arms through the arc identified as 22, air moving in the direction of the arrow 18 will enter the outer end of the arm and pass out one or more of the other arms. This air flow will cause the relatively light member 16 which may be in the lower end of the arm 12 as it enters this arc 22 (as shown in the drawing) to be literally blown out of the arm into the housing 10 and thence into one of the other arms. This causes the members 16 to be continually displaced or changed from one arm to another as the device rotates about the axis 14.

In order to prevent the escape of member 16 from the outer ends of the arms a suitable obstruction such as the bar or element 24 is secured to and extends across the end of the arm. In lieu of such an obstruction, the outer end of each of the arms may be necked down sufficiently so as to prevent the escape of the member 16 and still permit the entrance of air and the exit of air through the end of the arms.

While any suitable support may be provided for the device for positioning it in any environment desired, the illustrative organization discloses a support for retaining the wind-operated amusement device immediately outside the side window of an automobile. This support is preferably made of resilient metal strips and includes a pair of lower legs 26 and an upper leg 28. Each of these legs is bent away from the rotating amusement device at their outer end and accordingly in a direction that would be toward the window of an automobile. The upper end of leg 28 is reversely bent as shown in FIGURE 2 so as to fit over and snugly grip the upper end of the glass of an automobile window. This support bracket is arranged so that when it is mounted on the glass of the window and the window is rolled to its uppermost position the outer ends of the arms 26 will be resiliently urged into engagement with the outer face of the glass. Extending from the center of this support is a shaft 30 which extends into a suitable fitting provided on the wall or housing of body portion 10 with the shaft being journaled in this fitting whereby the housing and arms 12 may rotate about the shaft and with the axis of shaft 30 corresponding with the axis 14 of housing 10.

It will thus be seen that in accordance with the invention a novel wind-operated amusement device is provided for the amusement of relatively small children and which is particularly well adapted to be mounted on the window of an automobile.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. An amusement device of the type described comprising a hollow hub member, means supporting the hub for rotation about a given axis, a plurality of hollow generally transparent arms opening into and extending from the hub member in a direction generally outwardly from said axis and formed so the device is wind rotated about its axis when disposed in an enveloping air stream generally normal to said axis, said arms being arranged so the device is generally dynamically balanced for rotation about said axis, an active member loosely disposed in at least one of said arms for free movement therewithin with the outer ends of the arms being open to permit the ingress and egress of air but being formed to prevent the escape of the active member therethrough.

2. A wind operated amusement device comprising a hollow body member mounted for rotation about a predetermined axis, a plurality of hollow generally transparent arms opening into and secured to this member with these arms being symmetrically arranged with respect to and extending outwardly from said axis, an active colored member received in said arms for free movement therewithin, the outer end of the arms being open but formed to prevent escape of the active member therefrom, said device being constructed and arranged to rotate about said axis when disposed in an enveloping air stream the direction of which is generally normal to said axis.

3. The organization of claim 2 wherein the rotation of the device is effected by having the ends of the arms chamfered.

4. An amusement device wind rotated about its axis in response to being disposed in an enveloping air stream generally normal to its axis and comprising a central hollow body, means supporting said body for rotation about its axis, a plurality of generally transparent hollow arms opening into and extending from the body outwardly of the axis thereof and generally symmetrically arranged with respect to said axis, an active member received within the device and freely movable in the arms, the outer end of the arms being open for the ingress and egress of air but formed to prevent the escape of the active member therethrough.

5. An amusement device wind rotated about its axis and comprising a central hollow body, means supporting said body for rotation about its axis, a plurality of generally transparent hollow arms opening into and extending from the body outwardly of the axis thereof and generally symmetrically arranged with respect to said axis, an active member received within the device and freely movable in the arms, the outer end of the arms being open for the ingress and egress of air but formed to prevent the escape of the active member therethrough, said outer ends being similarly chamfered such that when the amusement device is placed within an enveloping air stream it will be rotated about its axis.

6. A wind operated amusement device comprising a hollow central portion, support means constructed to be removably mounted on the window of an automobile and support said central portion for rotation about an axis generally normal to the window, a plurality of hollow generally transparent arms opening into and extending from the central portion outwardly of and symmetrically disposed with relation to said axis, an active member within said device and of such a size as to be freely movable in said arms with the outer ends of the arms being open but preventing escape of said member, said device being constructed and arranged to be wind propelled about said axis in response to the wind created by movement of the automobile.

7. The organization of claim 6 wherein rotation of the device is effected by having the ends of the arms chamfered.

8. The organization of claim 6 wherein the support means includes a bracket including an arm portion to snugly receive the upper end of the window and other arm portions that bear against the surface of the window and extend divergently of the first named arm portion.

References Cited in the file of this patent

UNITED STATES PATENTS

| 1,200,791 | Young | Oct. 10, 1916 |
| 1,408,386 | Newton | Feb. 28, 1922 |
| 2,624,976 | Ferrera | Jan. 13, 1953 |
| 2,662,336 | Zalkind | Dec. 15, 1953 |

FOREIGN PATENTS

| 22,096 | Great Britain | Sept. 28, 1909 |